United States Patent [19]

Miller

[11] Patent Number: 4,487,648

[45] Date of Patent: Dec. 11, 1984

[54] SIMPLIFIED METHOD FOR MANUFACTURING AN AIRTIGHT CELL

[76] Inventor: Bearge Miller, 2-B Governor Markham Dr., Glen Mills, Pa. 19342

[21] Appl. No.: 385,015

[22] Filed: Jun. 4, 1982

Related U.S. Application Data

[62] Division of Ser. No. 198,628, Oct. 20, 1980, Pat. No. 4,396,814.

[51] Int. Cl.³ ........................ B32B 31/04; B32B 1/02

[52] U.S. Cl. .................................... 156/227; 156/297; 428/35; 428/76; 493/210; 493/243

[58] Field of Search ............................ 428/35, 68, 76; 493/210, 243; 150/1; 229/53; 156/227, 297

[56] References Cited

U.S. PATENT DOCUMENTS

| | | | |
|---|---|---|---|
| 3,319,540 | 5/1967 | Stengle, Jr. | 493/243 |
| 3,734,394 | 5/1973 | Dooley | 150/1 |

*Primary Examiner*—Paul J. Thibodeau

[57] ABSTRACT

A method for making an airtight, flexible cell for utilization in the application of door edge safety strips is disclosed. The illustrated technique describes a series of steps which may be applied to the raw sheet material used to reduce the number of folding operations required to produce a seam.

1 Claim, 14 Drawing Figures

SIMPLIFIED METHOD FOR MANUFACTURING AN AIRTIGHT CELL

REFERENCES TO PRIOR APPLICATIONS

The application is a division of applicant's prior application, Ser. No. 198,628, filed Oct. 20, 1980, and passed to issue Aug. 2, 1983 as U.S. Pat. No. 4,396,814.

SUMMARY OF THE INVENTION

The object of the invention is to provide a manufacturing method for the disclosed safety edge design which reduces construction time, manufacturing cost, and increases the integrity and reliability of the seals used to form the airtight cells of the invention.

Other objects and advantages of the invention will become apparent upon reading the following detailed description and upon reference to the drawings.

DETAILED DESCRIPTION OF THE INVENTION

The present invention will now be described with reference to the various drawings wherein like numerals refer to like parts.

Internal components may be covered by outer wall 76 which serves as protection and support for the internal components of the cell.

In the preferred embodiment, wall 76 is comprised of two individual layers or skins, shown as 24 and 26 in the various figures. Outer layer 24 is manufactured of reinforced polyester, in the preferred embodiment, and is approximately 18 mils in thickness. This outer layer surrounds the internal components completely and is formed from one continuous piece of material, as more fully described later.

Inner layer 26 is fashioned from a similar material, though a thinner gauge material is generally acceptable. The two layers, 24 and 26, comprising wall 76, are not internally bonded to each other. With the exception of the ends flange, the two layers simply lay against each other and are free to be displaced laterally without the generation of shear stresses between the layers.

Figure 1:
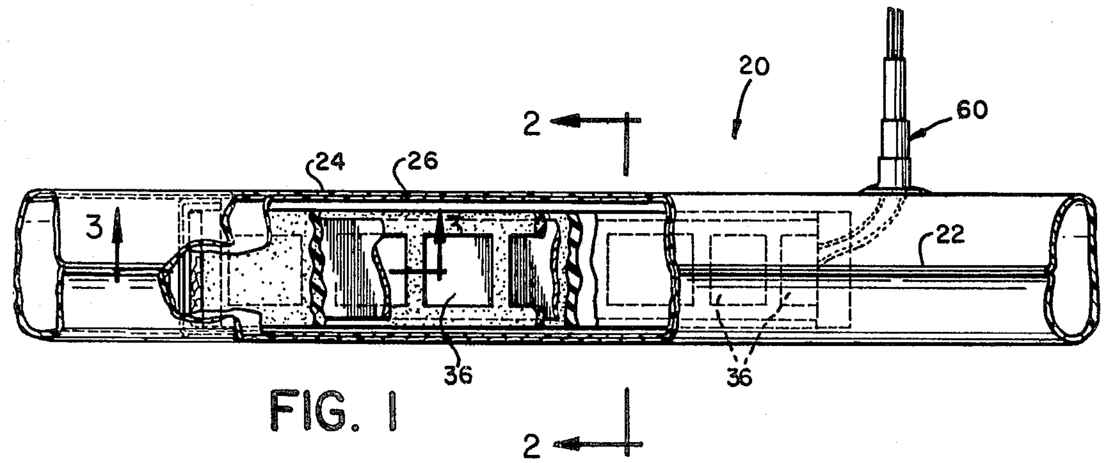
FIG. 1 is a cutaway plan view of a section of the present invention showing a phantom view of the internal layers.
Figure 2:
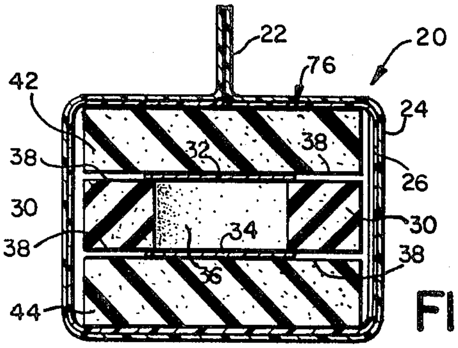
FIG. 2 is a sectional view of the present invention taken along line 2—2 in FIG. 1.
Figure 3:
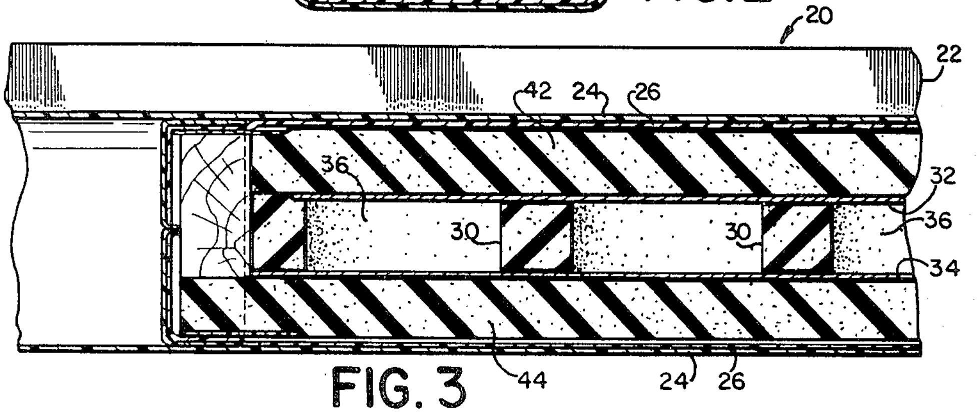
FIG. 3 is a sectional, horizontal view of the present invention taken along line 3—3 of FIG. 1.
Figure 4:
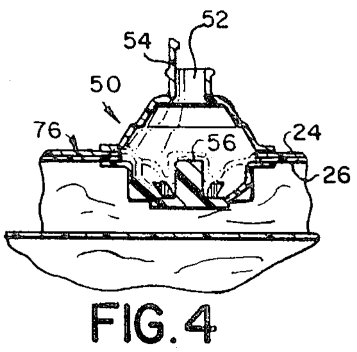
FIG. 4 is a sectional view of the air intake taken along line 4—4 of FIG. 5.
Figure 5:
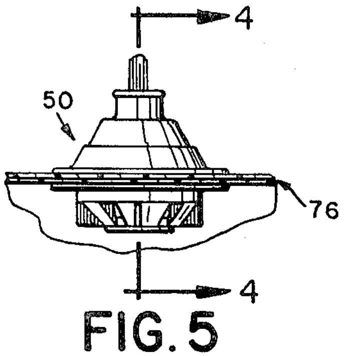
FIG. 5 is a side view of the air intake valve used in the present invention.
Figure 6:
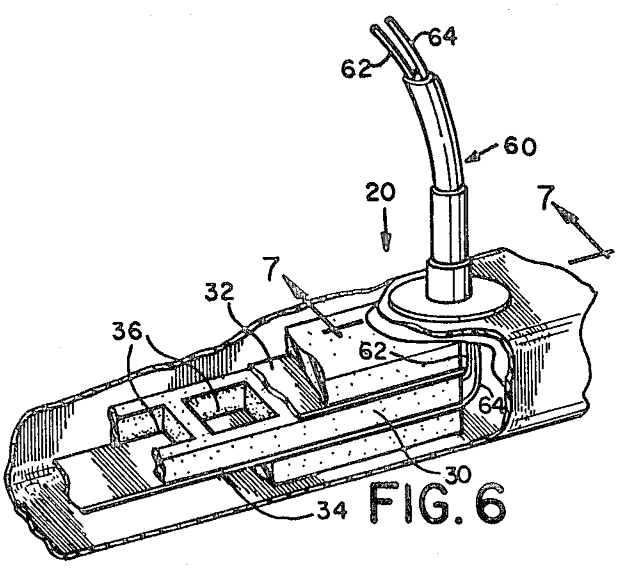
FIG. 6 is a fragmentary perspective view of the present invention further detailing its internal components.
Figure 7:
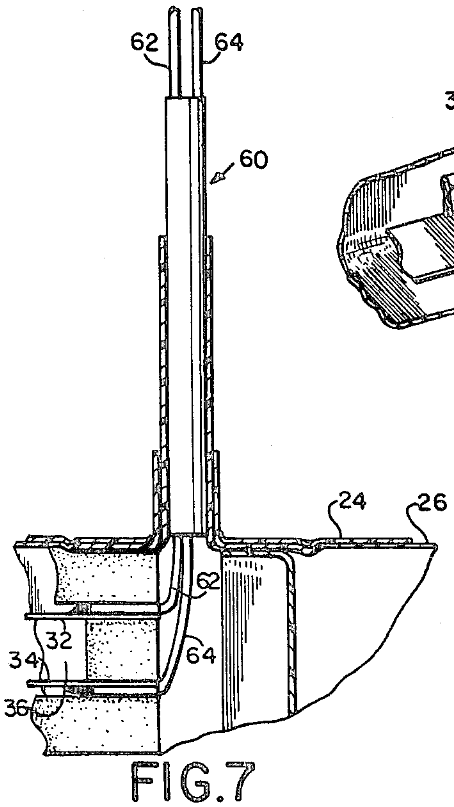
FIG. 7 is a sectional view of the present invention along line 7—7 in FIG. 6 showing the detail of the control wire exit duct and the internal electric wire connections.
Figure 9:
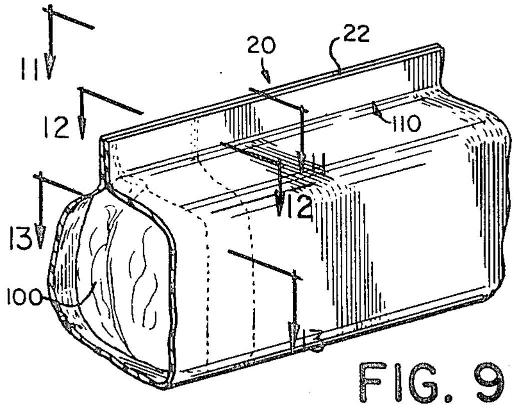
FIG. 9 is a perspective view of the end section of the present invention.
Figure 11:
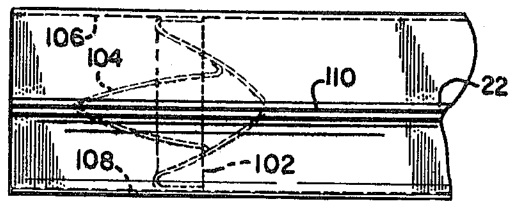
FIG. 11 is a sectional view of the end section encasement taken along line 11—11 in FIG. 9, illustrating the folding method used in sealing the edges in manufacturing the invention.
Figure 12:
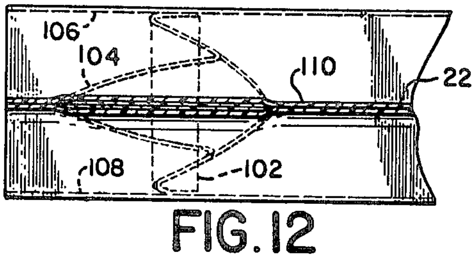
FIG. 12 is a sectional view of the end section encasement taken along line 12—12 in FIG. 9 further illustrating the folding method used in sealing the edges in manufacturing the invention.
Figure 13:
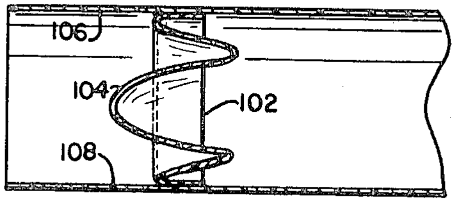
FIG. 13 is a sectional view of the end section encasement taken along line 13—13 in FIG. 9 further illustrating the folding method used in sealing the edges in manufacturing the invention.
Figure 14:
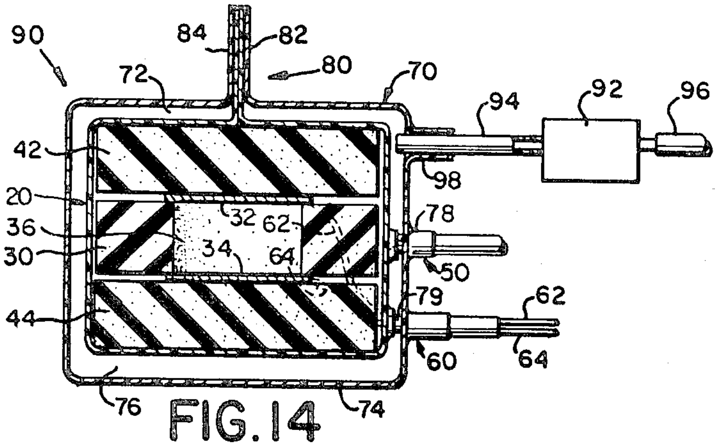
FIG. 14 is a sectional view of a variation of the preferred embodiment of the invention similar to the view shown in FIG. 2, generally taken along line 2—2 in FIG. 1.

Further, in accordance with the invention, wall 76, above described, is sealed in a fashion which causes it to form a pressure tight seal in all seams which may occur in the manufacture. Referring generally to FIGS. 2 and 3, and more specifically to FIG. 9, it will be appreciated that wall 76 is formed around the internal components in a manner which provides for an airtight seal at any location where wall 76 is bonded upon itself during the manufacturing process. Adjustment of internal air pressure is accomplished by the air intake valve located at a convenient location on wall 76. Turning now to FIG. 5, air intake valve 50 is shown mounted on wall 76 in a fashion which will allow an operator to inflate the internal porous areas within wall 76. FIG. 4 shows the internal workings of valve 50, and those skilled in the art will readily recognize its operation. Air is blown, or otherwise injected into intake 52 and further passes through secondary intake 56 to pressurize the internal areas within wall 76. Cap 54 is a safety cap used to seal the intake 52 after the pressurization operation is completed. In the preferred embodiment, valve 50 has a pressure locking mechanism at intake 56, which is closed by applying downward pressure on the valve 50.

It will be appreciated, by those skilled in the art, that valve 50 may be of a design which allows for coupling of various fixtures commonly used in air injection systems. For example, needle valves and the like, often used for inflation of automobile tires, may be advantageously used to allow simple, hand-operated air pumps to be employed in pressurization of the interior areas. It is contemplated that a hand operated pump, such as those used to inflate basketballs, footballs, bicycle tires and the like, which often incorporate air pressure gauges, may be advantageously utilized with the present invention. Utilizating such devices, accurately resettable internal pressures within the cell may be achieved as the internal pressure is more easily measured.

Turning now to FIGS. 8 through 13, a means to practice the present invention will now be described. As discussed above, the preferred embodiment requires an airtight cell to surround the internal components of the cell.

Figure 8:
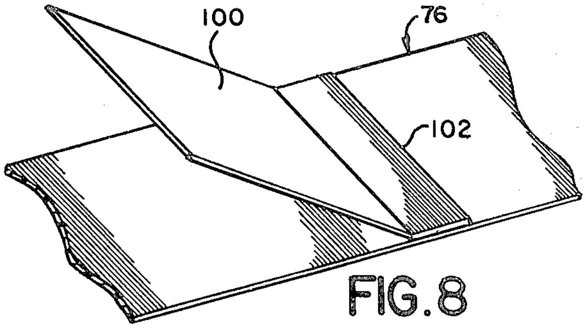
FIG. 8 is a developmental view of the end section encasement of the present invention illustrating a method of manufacture.
Figure 10:
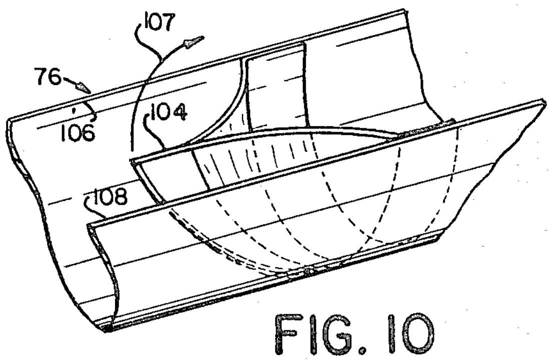
FIG. 10 is a developmental view of the end section encasement of the present invention illustrating a folding step used in the manufacture of the invention.

The wall 76, about the internal components of the cell, is formd by laying a sheet, of appropriate size, of the PVC material utilized in the invention, in a prone position. Sheet 100, shown in FIG. 8, is then welded in a position as shown. The bonding at 102 is accomplished by radio frequency heating and comprises methods and techniques well known to those skilled in the art. The large sheet comprising wall 76 is thus folded in a manner such as to channel it, as best shown in FIG. 10. Simultaneously, sheet 100, which will comprise the end closure of the invention, is folded accordingly so that it meets upon itself at 104. Fold 104 is brought up to a level where edge 106 and edge 108 of wall 76 are in the same plane.

Fold 104 is then raised vertically outward in the direction indicated by arrow 107 in FIG. 10 such that now fold 104 protrudes about edges 106 and 108.

From this point, a one step sealing process is possible. It will be appreciated that when edges 106 and 108 are brought together, they sandwich the leading edges of sheet 100, generally at fold 104. A one-step welding process, then applied along the top portion of the wall 76, shown as seam 110 in FIG. 9, will provide a seal which is both watertight and airtight and thus, provides the means to practice the invention as an airtight cell as required.

The inherent advantage over the prior art is found in the fact that the sealing along seam 110, thus forming flange 22, is now accomplished in one step. This process eliminates the possibility of pin-hole air leaks about the seams of wall 100, as is the case in conventional sealing processes for similar enclosures. The process thus described eliminates welding steps which would be necessary, and, in fact, are used when wall 100 is a separate, generally square shaped piece which is attached by multi-step welding processes. These processes entail welding along each edge of the square piece used in place of wall 100 in other enclosures, as found in this field of art. Experience has shown that the one-step welding process thus described, and shown in the drawings, provides a greater service lifetime, as the number of separate welds and seams is reduced.

The use of an inflatable cell as described herein has an added advantage of providing a greater flexibility when shipment of the cell necessitates folding of same. Prior switch assemblies do not provide a method to reduce or increase the internal air volume of the package. The folding of any such assemblies is difficult or impossible. An advantage of the present invention is found in that valve 50 may be left in an open position such as to allow internal pressure to be released should the volume be compressed in a folding process during packaging for shipment.

Thus it is apparent that there has been provided, in accordance with the invention, a safety edge switching device that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for making an airtight cell from three separate rectangular sheets of material, whereby:

a first sheet, substantially rectangular in shape, forming the main wall of said airtight cell; and a second sheet of material, substantially rectangular in shape, comprising one edge of said cell; and a third sheet of material, substantially rectangular in shape, comprising a second edge of said cell; are combined to comprise a substantially elongate shape, formed by a combination of welding of said second sheet of material to said first sheet, and welding said third sheet of material to said first sheet, whereas further said second sheet is attached to said first sheet substantially toward one end of the first sheet; said third sheet is attached substantially toward the end of said first sheet which is directly opposite the end which has said second sheet attached thereto, wherein said airtight cell is formed by the folding of said first sheet upon itself, across the direction which causes said first sheet to be folded about its longest longitudinal axis, wherein further said second sheet is folded such that its edge, said edge opposite the edge which is bonded to said first sheet, is folded in a fashion which brings each corner of said edge together at one point, wherein said folded edge is drawn vertically such as to allow it to protrude above the edges of said first sheet as it is folded about said longest longitudinal axis, said third sheet being folded in a fashion and processed identical to above described second sheet, wherein then said edges of said first sheet are compressed against each other such as to hold said edges of said second and third sheet which are drawn vertically, wherein said edge of said first sheet is welded onto itself, along said edges, further welded therebetween said vertically drawn edges of said second and third sheets.

* * * * *